(12) United States Patent
Kasmi (10) Patent No.: US 8,693,976 B2
(45) Date of Patent: Apr. 8, 2014

(54) PREFERENTIAL TREATMENT FOR EMERGENCY CALLBACK

(75) Inventor: Mustafa Anwar Kasmi, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 724 days.

(21) Appl. No.: 12/200,745

(22) Filed: Aug. 28, 2008

(65) Prior Publication Data

US 2010/0056099 A1    Mar. 4, 2010

(51) Int. Cl.
*H04M 11/04*  (2006.01)

(52) U.S. Cl.
USPC ............... 455/404.1; 455/404.2; 455/415; 455/560; 379/37; 379/45; 340/539.1

(58) Field of Classification Search
USPC ........... 455/404.1, 404.2, 415, 560, 418, 445; 379/157, 158, 201–218, 88.01, 37, 45; 370/259–271; 340/539.1
See application file for complete search history.

(56) References Cited

U.S. PATENT DOCUMENTS

| | | | | |
|---|---|---|---|---|
| 6,067,347 A * | 5/2000 | Farris et al. | ................. | 379/88.01 |
| 6,112,075 A | 8/2000 | Weiser | ................. | 455/404 |
| 6,128,481 A * | 10/2000 | Houde et al. | ................ | 455/404.2 |
| 6,148,190 A * | 11/2000 | Bugnon et al. | ............. | 455/404.1 |
| 6,249,674 B1 * | 6/2001 | Verdonk | ................. | 455/404.1 |
| 7,983,652 B1 * | 7/2011 | Hursey et al. | .............. | 455/404.1 |
| 8,244,204 B1 * | 8/2012 | Chen et al. | ................. | 455/404.1 |
| 2002/0111159 A1 * | 8/2002 | Faccin et al. | ................ | 455/422 |
| 2006/0040639 A1 | 2/2006 | Karl et al. | ................... | 455/404.1 |
| 2006/0227959 A1 * | 10/2006 | Mitchell | .................. | 379/221.13 |
| 2008/0214141 A1 * | 9/2008 | Burdick et al. | ........... | 455/404.1 |
| 2009/0253400 A1 * | 10/2009 | Jayanna | ..................... | 455/404.1 |

* cited by examiner

*Primary Examiner* — Mahendra Patel
(74) *Attorney, Agent, or Firm* — Baker & Hostetler LLP (57) ABSTRACT

Disclosed herein are techniques for allowing callbacks from emergency call centers to a subscriber, including when restrictions in place would have otherwise prevented the call. The technique may employ Camel, thereby triggering Camel when a subscriber dials an emergency or public safety call center. Camel's Mobile Switching Center (MSC) will set up a call to the emergency call center, and the Service Control Point (SCP) will suspend or disable the restrictions in place, such as parental control features. The restrictions may be suspended indefinitely, for a specific time period, until another triggering event, or the like. The subscriber, in this manner, can receive a callback from the emergency call center.

14 Claims, 8 Drawing Sheets

PREFERENTIAL TREATMENT FOR EMERGENCY CALLBACK

BACKGROUND

Value-added services have become an integral part of a consumer's expectations regarding the consumer's mobile communications device. Many of these value-added services are emerging applications in Intelligent Networks (IN) for mobile applications and may include such services as video or music download services, automate call forwarding services, ring-back tone services, prepaid services, and the like.

In the Global System for Mobile Communications (GSM) network or Universal Mobile Telecommunications System (UMTS) network, the Customized Application of Mobile Enhanced Logic (Camel) standard has been developed to aid GSM operators to offer operator-specific services to their subscribers. The Camel protocol is defined in a set of standards established by the ETSI (European Telecommunication Standardization Institute) and later upgraded as part of 3GPP (Third Generation Partnership Project) initiative. They allow an operator to define services over and above standard GSM/UMTS services.

The services supported by Camel may include call processing functions such as caller ID and call screening, call forwarding, call rerouting, and the like. Prepay and Account Spending Limit (ASL) may utilize Camel to allow for metering usage on a prepaid basis and post-paid basis. Camel may allow for call control, information to be passed to databases, call assistance for routing to a Public Safety Answer Point, and query of location based infrastructures such as the Gateway Mobile Location Center for precise positioning of the mobile device. Other LBS applications emerging that rely on Camel include directory services and location-based search and information. Many services can be created using Camel, and it is particularly effective in allowing these services to be offered when a subscriber is roaming, like for instance no-prefix dialing.

GMS/UMTS networks typically provide a service that allows a restricting entity to have control over the handsets. For example, parents may wish to set usage limits on a child's talk time, text messages, instant messages, and downloads, manage how and when a child can communicate, block numbers they deem inappropriate and filter access to accessible content, restrict access to mobile Web sites, allocate minutes among users of shared wireless plans, and the like. A subscriber, such as the child, may dial an emergency number, such as 911, even if the restrictions in effect would not have allowed any other call. When a subscriber dials emergency call center numbers, by standard the call does not trigger Camel into the call because of the complexity added to the emergency call by the Camel protocol.

It would be desirable to lift the call restrictions that are in place under certain circumstances. For example, while the child may be authorized to make the call to an emergency or public safety call center, the call center is subject to restriction and can be blocked from contacting the child. So, if a child's connection to a 911 call center is dropped due to a faded signal, for example, the 911 call center may be restricted from calling the child back because the child has reached his or her quota of incoming calls for the month or the call took place at a time of the day when the child is not allowed to receive any incoming call.

SUMMARY

Disclosed herein are techniques for allowing callbacks from emergency call centers to a subscriber, including when restrictions in place would have otherwise prevented the call. In an example embodiment, Camel will trigger when a subscriber dials an emergency or public safety call center. The Mobile Switching Center (MSC) will set up a call to the emergency call center, and the Service Control Point (SCP) will suspend or disable the restrictions in place, such as parental control features. The restrictions may be suspended indefinitely, for a specific time period, until another triggering event, or the like. Thus, if a subscriber initiates an emergency call but is disconnected, restrictions that would normally restrict access to the subscriber's mobile device are suspended. The subscriber, in this manner, can receive a callback from the emergency call center.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

In the Global System for Mobile Communications (GSM) network or Universal Mobile Telecommunications System (UMTS) network, the Customized Application of Mobile Enhanced Logic (Camel) standard has been developed to aid GSM operators to offer operator-specific services to their subscribers. The Camel standard may define the protocol for communication between different network elements, such as a Mobile Switching Center (MSC) and a Service Control Point (SCP), described in more detail below. Camel forms the basis to create services on an SCP, which is compatible with network elements of other vendors and between networks. For example, Camel enables a subscriber to roam between different networks (including those in different countries) and be reachable at the same number. Described herein are techniques that utilize Camel during or after the time when a subscriber initiates a call to an emergency call center.

The aspects summarized above can be embodied in various forms. The following description shows, by way of illustration, combinations and configurations in which the aspects can be practiced. It is understood that the described aspects and/or embodiments are merely examples. It is also understood that other aspects and/or embodiments can be utilized, and structural and functional modifications can be made, without departing from the scope of the present disclosure. For example, although some aspects herein relating to an emergency call center completing a call to a subscriber despite restrictions that are in effect that would otherwise disconnect the call, it should be noted that eligibility of a subscriber to make or receive a call can be based on any criteria established by a mobile telecommunications service.

Furthermore, in the discussion that follows, details relating to mobile devices and networks are assumed to be well known. Accordingly, such details are largely omitted herein for the sake of clarity and explanation. In addition, any references herein to an example embodiment involving a cellular telephone is solely for purposes of explanation, and is not intended to limit the invention to any such embodiment. For example, a mobile device as contemplated by various embodiments of the invention may include, but are not limited to: cellular telephones, personal digital assistants (PDAs), email devices and the like. The mobile device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA and other standards now known or to be developed in the future.

Figure 1:
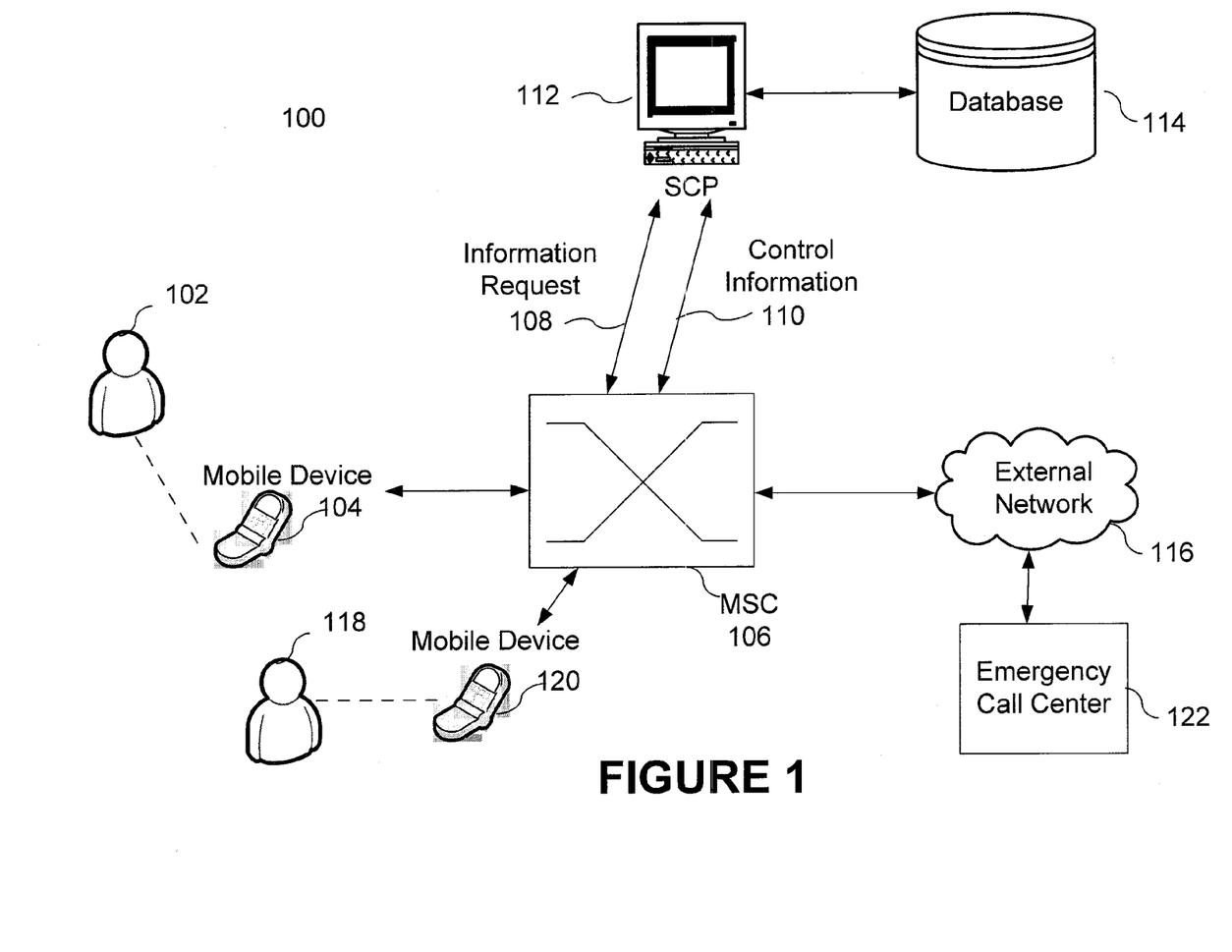
FIG. 1 is a high level view of a system depicting network elements in a conventional Camel network.

FIG. 1 depicts a system 100 that utilizes the Camel protocol. System 100 includes a subscriber 102, a mobile device 104, a Mobile Switching Center 106, a Service Control Point 112, a database associated with the Service Control Point 114, and an external network 116.

A subscriber 102 may initiate a call from the subscriber's mobile device or handset 104. Mobile device 104 may be representative of any appropriate type of device that may be utilized to receive a call or message and/or initiate a call or render and output a message in a suitable format to the subscriber. For example, in one embodiment, the device 104 may be any type of receiver or transceiver device with broadcast reception capabilities (e.g., cell phone, pager, PDA, PC, modem, router, gateway, specialized broadcast receiving device, first responder Mobile Data Terminal (MDT), FM/AM radio, NOAA weather radio, Land Mobile Radio (LMR), satellite radio receiver, satellite phone and television).

The network's Mobile Switching Centre (MSC) 106 receives the request to initiate the call from the mobile device 104. The Mobile Switching Center (MSC) 106 is the primary service delivery node for GSM. The MSC 106 is responsible for handling voice calls, SMS, and other services (e.g., conference calls, FAX, etc). The MSC 106 sets up and releases the end-to-end connection, handles mobility and hand-over requirements during the call, and takes care of charging and real time pre-paid account monitoring.

The MSC 106 sends a message, such as information request 108, that queries a database 114 associated with the Service Control Point (SCP) 112. The information request may be a request of information to originate a call, or a subscriber's request for a specific service, or the like. In accordance with the basic structure for a Camel network, a database 114 may contain information about a mobile subscriber 102 and the services to which the subscriber subscribes. For example, the information may include the identity of the mobile station, subscriber information including a subscriber profile, services subscribed to, restrictions and/or parental controls.

The Service Control Point 112 processes the query using the information from the database 114, determines an appropriate response, and then sends a message, such as control information 110, back to the MSC 106 with a direction as to the action that should be taken in response to the information request 108. For example, the SCP 112 may recognize that the request is made by a prepaid subscriber. By using the destination number, the current time, and other information, the SCP 112 may calculate the price per minute for the connection. If the subscriber's balance is sufficient, the SCP 112 may allow the call to proceed, informing the MSC 106 for how many minutes the authorization is valid. The MSC 106 then continues and connects the call via the external network 116.

GMS/UMTS networks typically provide a service that allows control over the handsets. For example, a requesting entity 118 may be a parent that desires to set usage limits on a child's talk time, text messages, instant messages, and downloads, manage how and when a child can communicate, block numbers they deem inappropriate and filter access to accessible content, restrict access to mobile Web sites, allocate minutes among users of shared wireless plans, and the like. Similarly, other requesting entities, such as employers or schools, for example, may desire to enforce restrictions. Such restrictions may be implemented into system 100. For example, the SCP 112 may maintain restrictions to be enforced that limit the activities of the mobile device 104. When the MSC 106 sends a request for a call initiation, the SCP 112 may verify that no restrictions are being violated before authorizing a call.

If the call the subscriber 102 is attempting to initiate is to an emergency call center 122, Camel may be triggered such that MSC 106 handles the call in a similar manner as described above. In most systems today, all calls to emergency call centers 122 are authorized, despite any restrictions that may be in place. However, triggering Camel for such calls in the manner disclosed herein enables certain restrictions to be lifted so that an emergency call center 122 may call the subscriber back if necessary. Thus, when SCP 112 processes the query from MSC 106 to determine if the call is authorized, the SCP 112 may suspend restrictions that are in effect.

The SCP 112 may have a restrictions module that suspends any or all restrictions that are associated with the particular subscriber 102. For example, the restrictions in place may be suspended to allow any and all network activity of the mobile device. Alternately, the restrictions may be suspended only to the extent that incoming calls from specific numbers are allowed, but, for example, a restriction to access to a particular web site from the subscriber's device 104 may remain active. Similarly, if a pre-paid restriction, incoming/outgoing call count restriction, SMS count restriction, or the like, is in triggered, the restrictions may be suspended such that the subscriber 102 may make or receive calls or messages in addition to the allotted amount. In this manner, the call to the emergency call center 122 triggers a suspension of the restrictions normally enforced by the SCP 112 to allow the emergency call center 122 to call the subscriber 102 back if necessary.

The SCP 112 may notify the restricting entity about the suspended restrictions. For example, a parent 118 has put a restriction in place that only allows a child 102 fifty incoming/outgoing calls a month, and the child 102 has reached fifty calls when the child 102 attempts to make an emergency call. The child 102 initiates a call to an emergency call center 122, such as a 911 call center. Upon receipt of a query to initiate the call from MSC 106, SCP 112 determines that the child has reached the allotted fifty incoming/outgoing calls allowed, and the restriction prevents additional non-emergency outgoing calls from being made by the child 102 as well as the receipt of any additional incoming calls. The SCP 112, however, may lift this restriction while MSC 106 proceeds with the emergency call. The type of calls, e.g., emergency, and the restrictions that are in effect may be transparent to the MSC 106. An indication within the SCP 112 may indicate that certain restrictions are suspended for future scenarios. Thus, if a callback attempt to the subscriber 102 is made, the SCP 112 may authorize the call in light of the suspended restrictions. The SCP 112 may continue to enforce other restrictions, such as continuing to restrict all outgoing calls, or prevent access to certain web sites, for example. But, the suspended restriction will allow the subscriber 102 to receive incoming calls, thereby enabling the subscriber 102 to receive a callback from an emergency call center 122.

The SCP 112 may inform the restricting entity 118, e.g. a parent, that a restriction has been suspended via several methods. For example, the SCP 112 may instruct the MSC 106 to send an SMS to the parent's mobile device 120, informing them that the child's mobile device 104 initiated an emergency call and restrictions on the child's mobile device 104 have been lifted. The SCP 112 may suspend the restrictions on a subscriber's mobile phone 104 for a specified amount of time, until reactivation by the restricting entity, until a confirmation that the emergency has ended, or the like. For example, once SCP 112 suspends the restrictions for a child's mobile device 104, the parent 118 may need to access the subscriber's account and reactivate the restrictions.

If a call is authorized by SCP 112, the call is connected to another user via the external network 116 in a process that is transparent to the subscriber 102. For example, a subscriber short code dialing over a Virtual Private Network may initiate a call to a colleague's internal extension telephone number. The MSC 106 may initiate the call, sending a message to the SCP 112 to query the database 114 associated with the SCP 112. The SCP 112 may process the query, determine that the colleague is in another country and that the call needs to be routed to the colleague's mobile phone. Alternately, if a restrictive control had been put into effect with respect to the subscriber's mobile device, the SCP 112 may determine if the call is restricted. For example, there may be a restriction associated to the mobile device 104 that prevents the initiation of calls after 10 pm. If the subscriber is attempting to make a call past 10 pm, the SCP 112 may determine that the call should be terminated, and send this message to the MSC 106.

The external network 116 can be any type of communication network including the example networks described below in FIG. 4-6, for example. Additionally, the wireless broadcast network 116 can be operated by a network provider. For example, an organization, corporation, association, or the like, for example, a mobile communications provider such as Verizon Corporation, Sprint Corporation, AT&T Corporation, T-Mobile Corporation, and the like, can implement Camel standards and use it to support the completion of a call from an emergency call center to a subscriber with restricted access.

Figure 2:
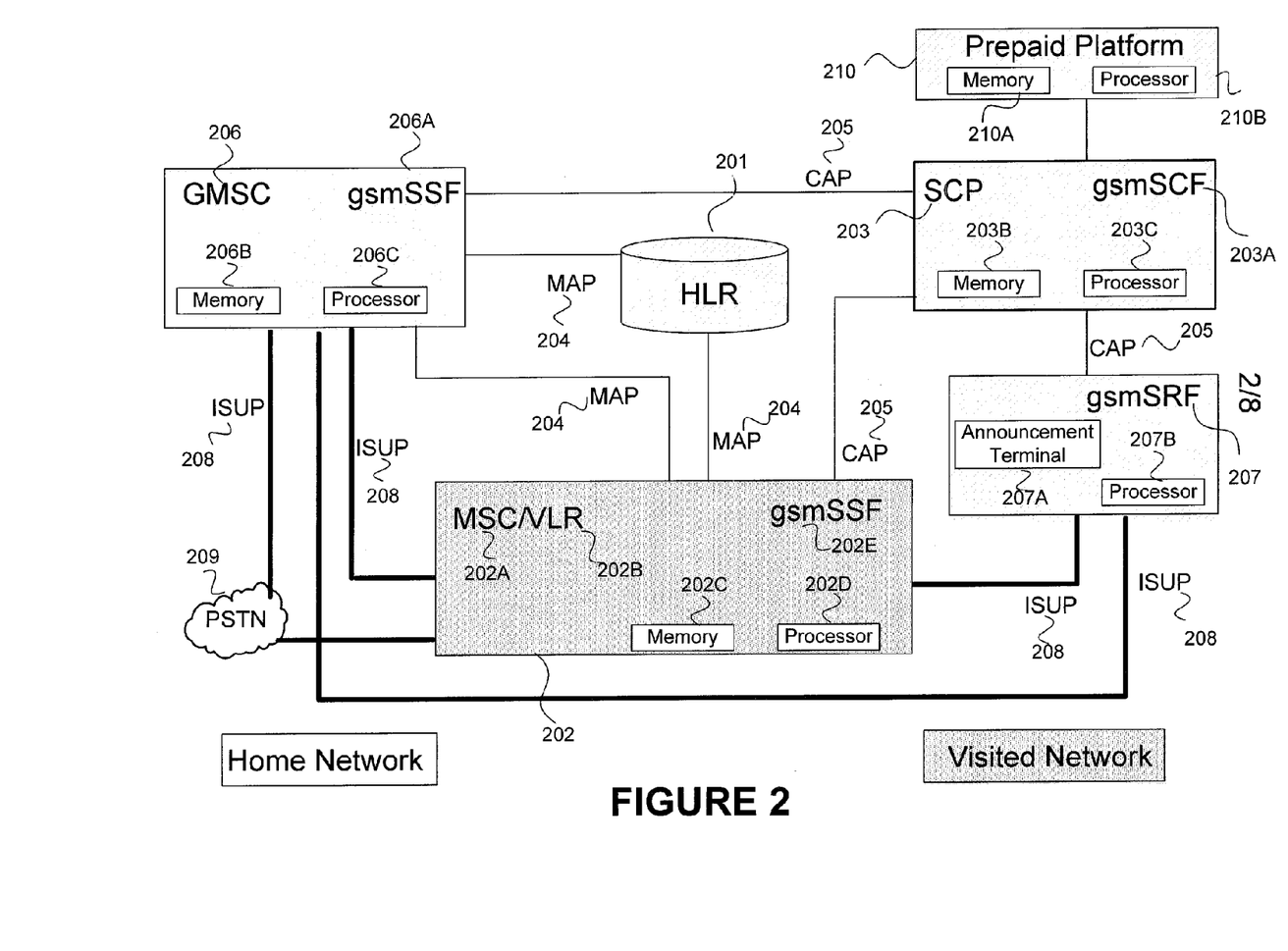
FIG. 2 is a block diagram depicting network elements in a conventional Camel network.

FIG. 2 depicts exemplary network elements that can be utilized in a conventional Camel network. Signaling for call set up and call tear-down between network elements shown in FIG. 1 can be accomplished using ISDN User Part (ISUP) 208, which is a part of the Signaling System #7 (SS7) communications protocol for signaling originating and terminating switching locations of telephone calls in a Public Switched Telephone Network (PSTN) 209. The PSTN merely shows the entity where the other party in a telephone call may reside; i.e. the other party can be either a mobile subscriber or a fixed line subscriber.

As shown in the configuration depicted in FIG. 2, an exemplary Camel network can include a Home Location Register (HLR) 201, which can hold the Camel Subscription Information (CSI) for each subscriber in the Camel network. The CSI for a subscriber can include subscription information regarding call processing and call feature enhancements. The set of information provisioned in the HLR for the control of a mobile originating call is known as O-CSI. This includes the set of TDP that can intercept the processing of an originating call and also includes a set of parameters to control the actions at each of those TDPs. In a similar manner, the set of information provisioned in the HLR for the control of a terminating call to a mobile subscriber as recipient of the call is known as "T-CSI." The T-CSI for a terminating mobile subscriber can include the set of TDPs that can intercept the processing of a terminating call towards that subscriber and a set of parameters to control the actions at each of those TDPs.

The exemplary Camel network shown in FIG. 2 also can include a Mobile Switching Center/Visiting Location Register (MSCNVLR) 202. The MSCNVLR 202 can include a Mobile Switching Center (MSC) 202A, memory 202C, and processor 202D that receives and processes a mobile subscriber's request to make a call, and a database of roaming mobile subscribers within the MSC's service area, known in the art as a Visiting Location Register (VLR) 202B.

In accordance with conventional mobile call processing methods, when a mobile subscriber enters an area served by MSC 202A, the subscriber's location is updated in the HLR to point to VLR 202B. During such an update, VLR 202B also can be updated to include the subscriber's Originating Camel Subscription Information (O-CSI) from the HLR 201 via Mobile Application Part (MAP) (204). MSC 202A can then use the visiting mobile subscriber's O-CSI to govern processing of an outgoing mobile call originated by the subscriber.

The exemplary Camel network shown in FIG. 2 can also include Service Control Point (SCP) 203, which includes a memory 203A and a processor 203B. In accordance with a conventional Camel network, the address for the SCP in a subscriber's home network is part of the subscriber's O-CSI that is obtained during an update of the VLR. During outgoing call setup for a mobile subscriber, MSCNVLR 202 can contact SCP 203 using GSM Service Switching Function (gsmSSF) 202E within MSCNVLR 202 by way of Camel Application Part (CAP) protocol 205, to inform SCP 203 that the caller is a Camel subscriber and that the call should be processed by Service Control Function gsmSCF 203A.

The exemplary Camel network shown in FIG. 2 also depicts network elements that can be used to process an incoming (terminating) call to a Camel mobile subscriber. When a call is made to a mobile user in the network, the call can be received by a Gateway Mobile Switching Center 206, which also includes GSM Service Switching Function (gsmSSF) 206A, memory 206B, and processor 206C. As shown in FIG. 1, when an incoming call directed to a mobile subscriber in a Camel network is received, GMSC 206 can fetch the Terminating Camel Subscription Information (T-CSI) from that mobile subscriber's HLR 201 via Mobile Application Part (MAP) 204. Once the T-CSI is received from the HLR 201, in a similar manner as for an outgoing call, GMSC 206 can contact Service Control Point (SCP) 203 using gsmSSF 206A within GMSC 206 by way of Camel Application Part (CAP) protocol 205 to inform the SCP that the caller is a Camel subscriber and that the call should be processed by Service Control Function gsmSCF 203A.

SCP 203 also can obtain information regarding the mobile subscriber from Prepaid Platform 210 having memory 210A and processor 210B. Memory 210A in Prepaid Platform 210 contains information regarding a prepaid mobile subscriber's prepaid account, for example, account balance, call charging history, and special rate information, if any, and processor 210B can calculate a prepaid subscriber's account balance and available funds and determine whether a prepaid subscriber has sufficient funds for a call.

FIG. 2 also depicts Specialized Resource Function gsmSRF 207, which may contain an Announcement Terminal 207A, as an element of a conventional Camel network. The SCP 203 can instruct the MSC/VLR 202A or GMSC 206, depending on whether the call is an outgoing or terminating call, to set up a speech path to gsmSRF 207 via, for example, Camel Operation Establish Temporary Connection. The gsmSRF 207, in turn, contacts the SCP 203 via CAP 205 and receives messages from SCP 203 via CAP 205 that enables the gsmSRF to play one or more message to a caller. For example, if processor 203C in the SCP determines that a call to the subscriber would otherwise be restricted, the processor 203C can instruct SCP 203 to instruct the MSC that the call is approved.

A subscriber's HLR in a Camel network is "armed" with various Camel Trigger Detection Points (TDPs). A detection point (DP) can be described as being "armed" if it has been activated and is available for use in processing the call. Alternatively, a DP can be "suppressed" if it has not been activated or has been deactivated and is thus not available for use in processing the call. These TDPs can be predefined in a Camel network and can form part of the subscriber's Camel subscription profile in the HLR. These TDPs are "armed" from the outset of the call processing and can determine at what point in the call the MSC will communicate with the SCP and can determine the nature and content of that communication.

For a prepaid mobile subscriber in a conventional Camel network, a call made by that prepaid subscriber (also known as an "originating call") can involve a TDP known as "DP2-Collected Information" during the call set-up phase. Similarly, a call made to that prepaid subscriber (also known as a "terminating call") can involve a TDP known as "DP12-Terminating Attempt Authorized" during the call set-up phase. Output of each of DP2 and DP12 instructs the MSC to contact the SCP to determine whether the prepaid subscriber has sufficient funds in her prepaid account balance or is otherwise eligible to permit the call to go forward.

A subscriber's eligibility to get a call from an emergency center also can be based on the call being placed from or to a special location where all calls are allowed, such as an area where a hurricane or other disaster has struck, or the call being placed at a special time, such as during a special promotional time. Also, although some aspects herein are described in the context of a mobile user in a "roaming" mode as a visitor in another network, it is known in the art that from the point of view of signaling, all mobile users are considered to be roamers, with "home" being simply a special case of roaming. Thus, one skilled in the art would readily understand that aspects described herein in the context of a "roaming" mobile user are equally applicable to a mobile user in her home network. In addition, although the aspects herein are described in the context of a particular Basic Call State Model using particular nomenclature for the steps and operations therein, it should be noted that variations in call state configurations and protocols may be used to process prepaid mobile calls in a Camel network and that such variations in configuration and protocol are within the scope of the present disclosure.

Figure 3A:
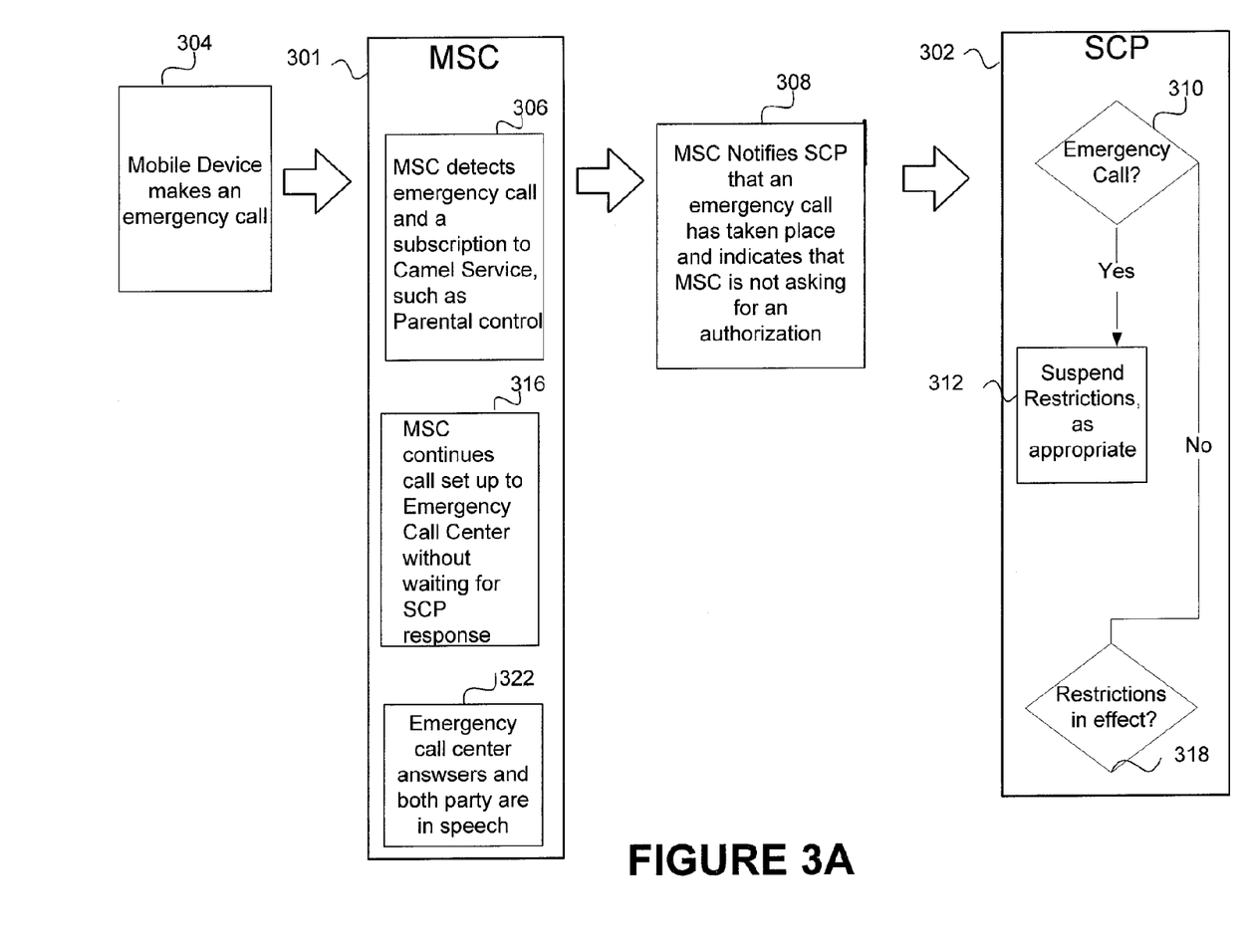
FIG. 3A, FIG. 3B, and FIG. 3C each depict an example of a call flow in a mobile network in a Camel network in accordance with conventional methods.

FIG. 3A depicts an exemplary call flow for an emergency call in a Camel network. The call processing involves information flow between MSC 301 and SCP 302. At 304, the mobile device makes an emergency call. At 306, MSC 301 detects the emergency call and that the subscriber's subscribes to a Camel service, such as parental control. MSC 301 notifies SCP 302 that an emergency call has taken place with an indication that authorization is not being requested from SCP 302, due to the call being an emergency call which is authorized because it is an emergency.

At 310, SCP 302 evaluates the call differently if it is an emergency call or not. For example, if the call was not an emergency, SCP 302 would determine which restrictions, if any, were in effect at 318. At 312, if the call is an emergency, SCP 302 suspends restrictions that are in place, as appropriate. For example, if a parental control restriction or employer control restriction was in place that prevents the receipt of phone calls after 10 pm, SCP 302 could lift this restriction upon the determination that subscriber made an emergency call. This enables the mobile device to receive a callback from the emergency call center, for example.

Meanwhile, at 316, MSC 301 continues to set up the subscriber's call to the emergency call center, without a need for call authorization from SCP. At 322, the emergency call center answers and the parties are connected.

Figure 3B:
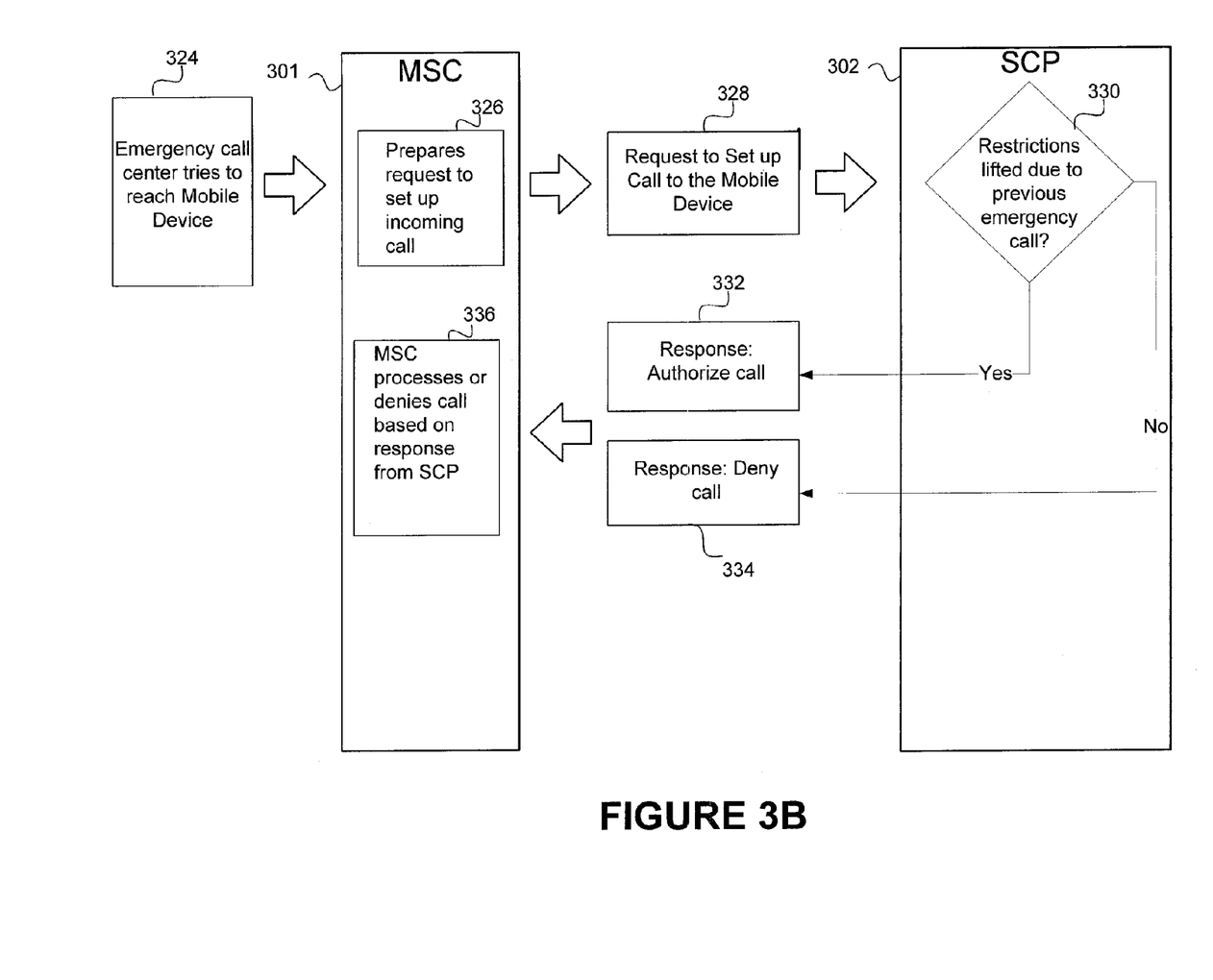

FIG. 3B depicts an exemplary call flow when an emergency call center tries to reach a subscriber. At 324, the emergency call center tries to reach a mobile device. MSC 301 prepares the request to set up the incoming call at 326 and, at 328, the request is sent to SCP 302. SCP 302 determines whether or not restrictions are in effect at 310. For example, following the call flow depicted in FIG. 3A, the SCP 302 would have lifted restrictions that were in effect due to the emergency call by the subscriber. Thus, at 332, SCP 302 would authorize the callback from the emergency call center. On the other hand, if the restrictions were not lifted, or they were lifted but thereafter reinstated, SCP 302 would deny the call at 334. At 336, MSC 301 processes or denies the callback based on the response from the SCP 302.

Figure 3C:
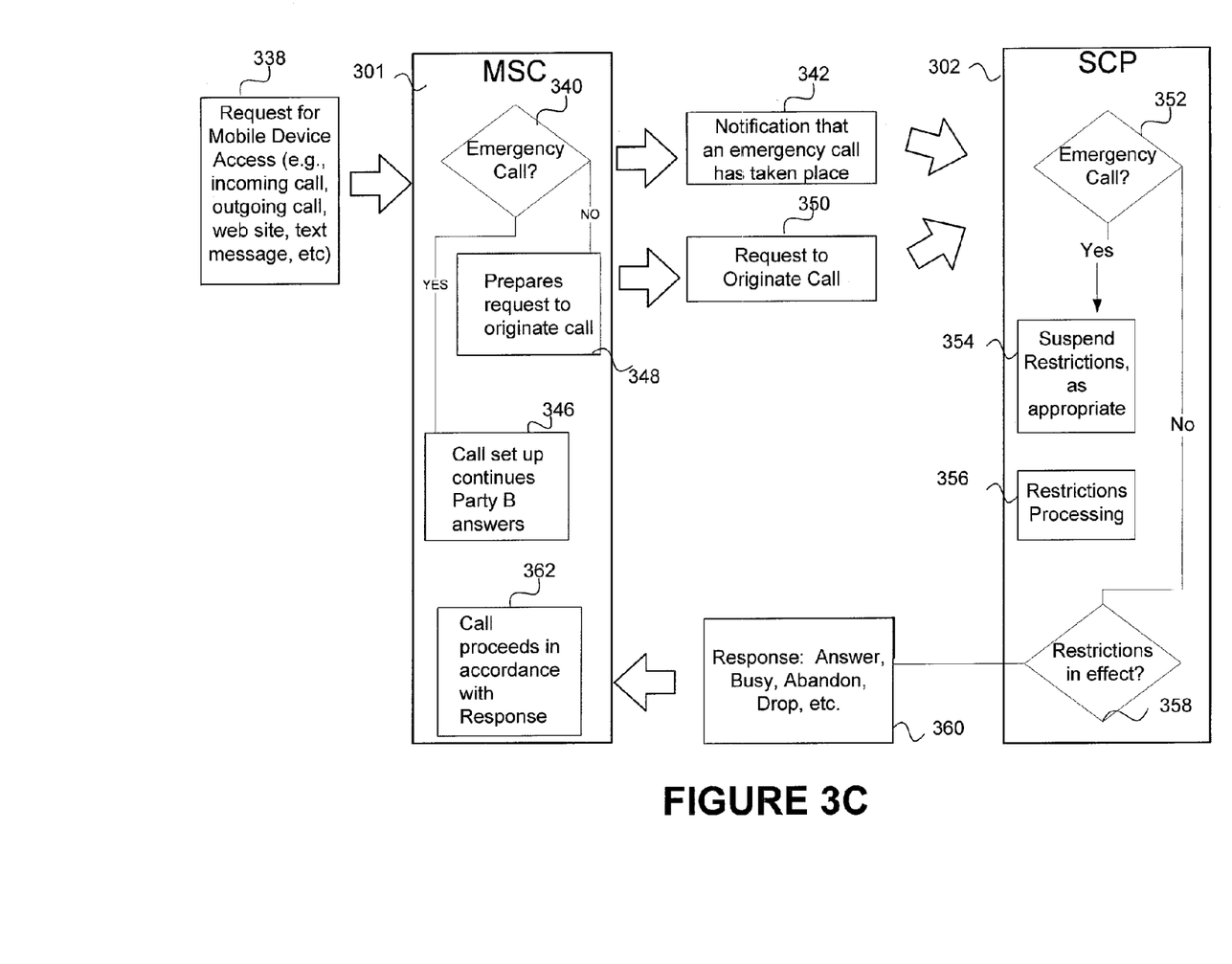

FIG. 3C depicts, generally, the exemplary call flow in a Camel network, incorporating the flow depicted in FIGS. 3A and 3B. The call processing involves information flow between MSC 301 and SCP 302. At 338, a request for mobile device access (e.g., incoming/outgoing call, incoming/outgoing SMS message, web access, etc) is made. Unless the call is a request by the subscriber to make an emergency call, the subscriber's outgoing (originating) call may be intercepted due to the presence of a Camel subscription in the caller's network at 340, at which point MSC 301 prepares a request to originate the call at 348.

If the call is an emergency call at 340, MSC 301 continues to set up the call without needing authorization at 346. Upon receipt of either the notification that an emergency call has taken place at 342, or the request to originate a call at 350, SCP 302 makes its own determination whether or not the call is an emergency call at 352. If it is not an emergency, SCP 302 determines what restrictions, if any, are in effect at 358. For example, if the call attempted would exceed the number of calls that are allotted to the subscriber per month, or if the call is being attempted during a blocked time of day, then SCP 302 will make this determination at 358. At 360, SCP 302 will respond to MSC's 301 request to originate the call at 350 based on what restrictions are in effect. If the call is not effected by the restrictions, then SCP 301 authorizes the call and arms one or more Event Detection Points in the call (for example, detection points relating to Answer, Busy, or Abandoned status of the call) and returns that information to MSC 301.

The request for mobile device access at 338 may be an attempt by the subscriber to make an emergency call. MSC 301 may immediately set up the call, without seeking authorization from SCP 302, but still notifying SCP 302 at 342 that an emergency call has taken place. SCP 302 determines that the call is an emergency and may suspend restrictions as appropriate at 354. For example, a restriction on the receipt of any additional incoming calls may be lifted. In this manner, if the emergency call was disconnected between the subscriber and the emergency call center, for example, a restriction on incoming calls to the subscriber may be suspended such that the emergency call center would not be precluded from calling the subscriber back due to the restrictions. An incoming call that would have otherwise been prevented may be received by the subscriber.

At 338, a request for mobile device access may be another incoming call, or a request to make a non-emergency outgoing call, create or receive an SMS message, access a web page via the mobile device, or other network activity, for example. As shown in FIGS. 3A-3C, if this request for access to this device occurs subsequent to the subscriber's emergency call attempt, restrictions may have previously been suspended at 312. For example, a restriction on incoming calls have been previously suspended at 354, allowing incoming calls that would otherwise be restricted. Alternately, at 338 the request for mobile device access may be the subscriber's attempt to access a particular web page. If this request for mobile device access is subsequent to the subscriber's emergency call attempt, a restriction on access to this particular web page via the mobile device may still be restricted by SCP 302 (i.e., access to the particular web page was not one of the appropriate restrictions to suspend).

At 356, SCP 302 may perform restrictions processing to determine if restrictions should remain suspended or be reactivated. The restrictions processing 356 may include the suspension or lifted suspension of restrictions. The processing may be triggered by the network that the mobile device is accessing, by the restricting entity, by a time limit, or the like. For example, the restricting entity, such as a parent, may be notified that the parent's child made an emergency call and the child's mobile device restrictions were suspended. The parent may access an interface for updating the desired restrictions and request reinstatement of the restrictions. The Restrictions Processing module 356 will function to reinstate the restrictions, so the next request for mobile device access at 338 may again be limited by the reinstated restrictions.

The following description sets forth some exemplary telephony radio networks and non-limiting operating environments for incorporating Camel standards. The below-described operating environments should be considered non-exhaustive, however, and thus the below-described network architectures merely show how the services of the MSC and SCP work with restrictions processing. It can be appreciated, however, that the system for processing restrictions can be incorporated into existing and/or future alternative architectures for communication networks as well.

The global system for mobile communication (GSM) is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As can be appreciated, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma1000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), etc., as well as to other network services that become available in time. In this regard, the techniques of the emergency callback and restrictions processing module can be applied independently of the method of data transport, and do not depend on any particular network architecture, or underlying protocols.

Figure 4:
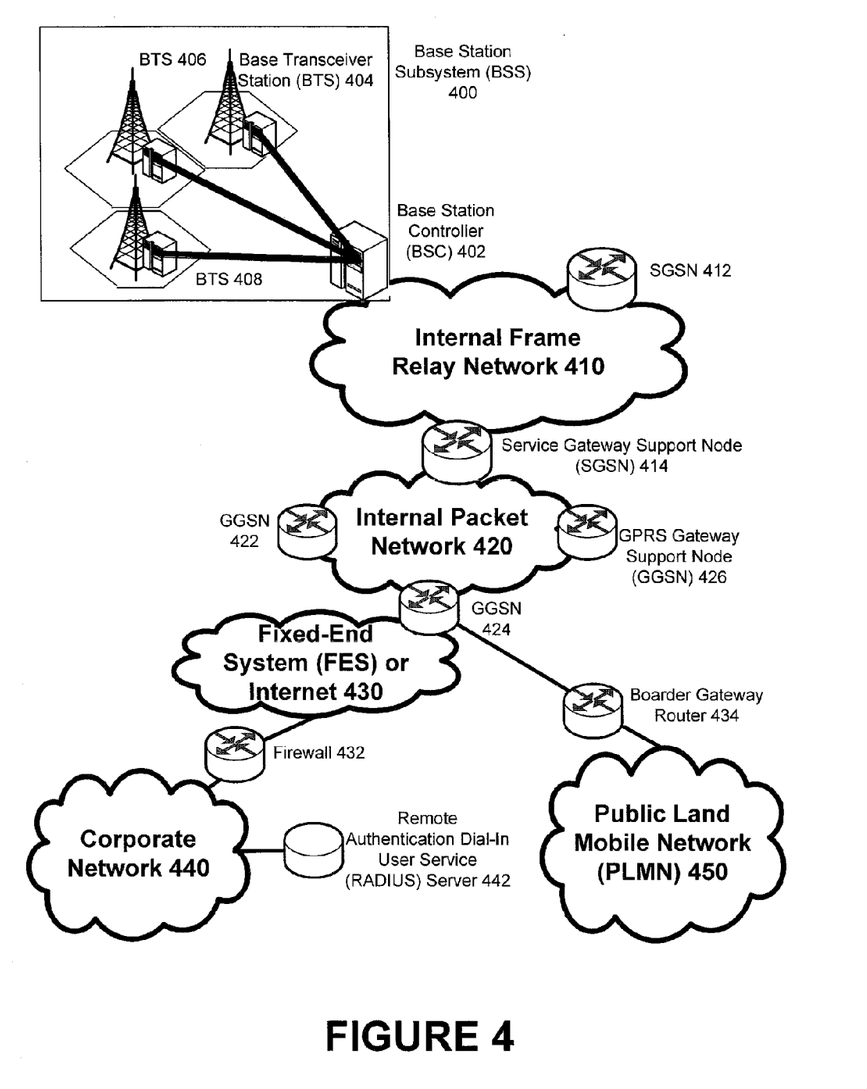
FIG. 4 depicts an overall block diagram of an exemplary packet-based mobile cellular network environment, such as a GPRS network, in which the system for providing alert messages based on a characteristic and/or configuration can be practiced.

FIG. 4 depicts an overall block diagram of an example packet-based mobile cellular network environment, such as a GPRS network, in which mobile device restrictions and emergency callbacks can be practiced. In an example configuration, there are a plurality of Base Station Subsystems (BSS) 400 (only one is shown), each of which comprises a Base Station Controller (BSC) 402 serving a plurality of Base Transceiver Stations (BTS) such as BTSs 404, 406, and 408. BTSs 404, 406, 408, etc. are the access points where users of packet-based mobile devices (e.g., WCD 102) become connected to the wireless network. In exemplary fashion, the packet traffic originating from user devices (e.g., WCD 102) is transported via an over-the-air interface to a BTS 408, and from the BTS 408 to the BSC 402. Base station subsystems, such as BSS 400, are a part of internal frame relay network 410 that can include Service GPRS Support Nodes (SGSN) such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol (IP) networks such as Public Land Mobile Network (PLMN) 450, corporate intranets 440, or Fixed-End System (FES) or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service (RADIUS) server 442 may be used for caller authentication when a user of a mobile cellular device calls corporate network 440.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
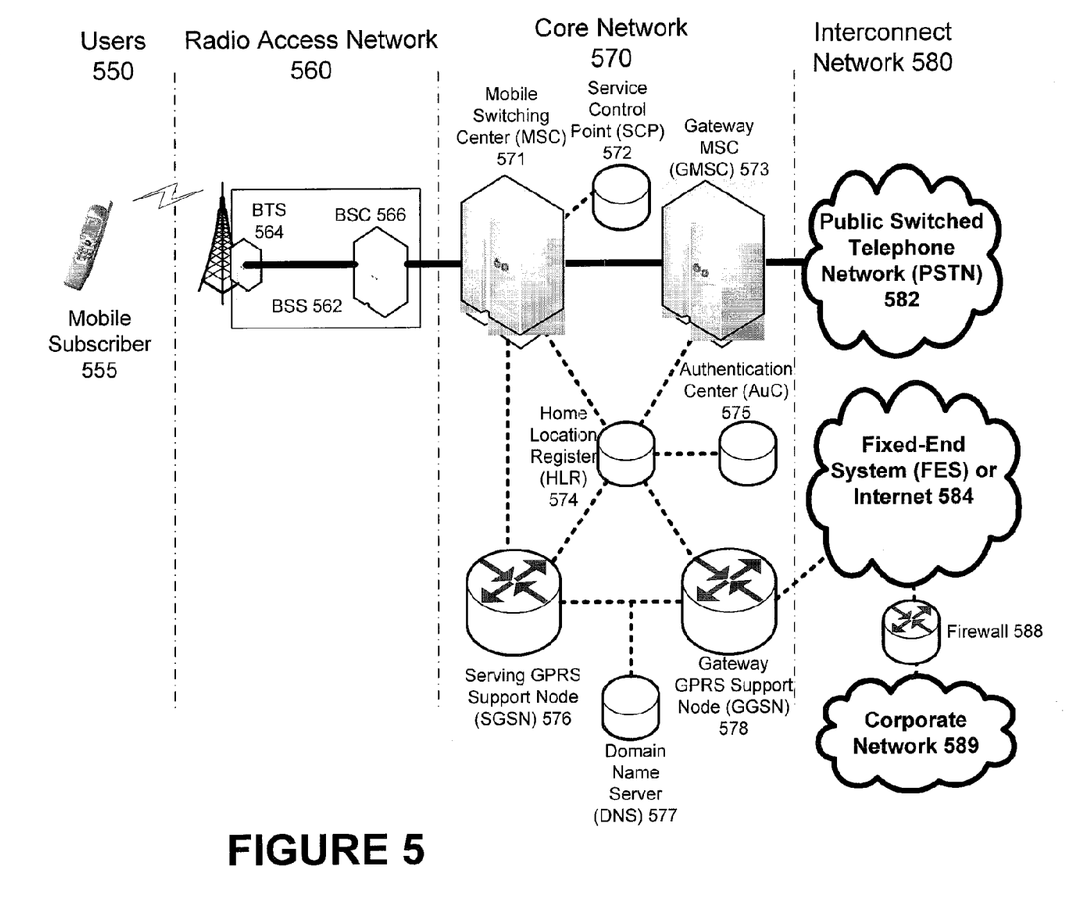
FIG. 5 illustrates an architecture of a typical GPRS network as segmented into four groups.

FIG. 5 illustrates an architecture of a typical GPRS network as segmented into four groups: users 550, radio access network 560, core network 570, and interconnect network 580. Users 550 comprise a plurality of end users (though only mobile subscriber 555 is shown in FIG. 5). In an example embodiment, the device depicted as mobile subscriber 555 comprises the WCD 102. Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center (MSC) 571, Service Control Point (SCP) 572, gateway MSC 573, SGSN 576, Home Location Register (HLR) 574, Authentication Center (AuC) 575, Domain Name Server (DNS) 577, and GGSN 578. Interconnect network 580 also comprises a host of various networks and other network elements. As illustrated in FIG. 5, interconnect network 580 comprises Public Switched Telephone Network (PSTN) 582, Fixed-End System (FES) or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network (PSTN) 582 through Gateway MSC (GMSC) 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate.

33 The HLR 574 is a centralized database for users to register to the GPRS network. HLR 574 stores static information about the subscribers such as the International Mobile Subscriber Identity (IMSI), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In this disclosure, depending on context, the term mobile device user may be a subscriber, and either reference may sometimes refers to the end user and sometimes to the actual portable device, such as the WCD 102, used by an end user of the mobile cellular service. When a mobile subscriber turns on his or her mobile device, the mobile device goes through an attach process by which the mobile device attaches to an SGSN of the GPRS network. In FIG. 5, when mobile subscriber 555 initiates the attach process by turning on the network capabilities of the mobile device, an attach request is sent by mobile subscriber 555 to SGSN 576. The SGSN 576 queries another SGSN, to which mobile subscriber 555 was attached before, for the identity of mobile subscriber 555. Upon receiving the identity of mobile subscriber 555 from the other SGSN, SGSN 576 requests more information from mobile subscriber 555. This information is used to authenticate mobile subscriber 555 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 555 was attached before, to cancel the location process for mobile subscriber 555. HLR 574 then notifies SGSN 576 that the location update has been performed. At this time, SGSN 576 sends an Attach Accept message to mobile subscriber 555, which in turn sends an Attach Complete message to SGSN 576.

After attaching itself with the network, mobile subscriber 555 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 555. The mobile subscriber 555 uses an algorithm to send the user identification (ID) and password to SGSN 576. The SGSN 576 uses the same algorithm and compares the result. If a match occurs, SGSN 576 authenticates mobile subscriber 555.

36 Next, the mobile subscriber 555 establishes a user session with the destination network, corporate network 589, by going through a Packet Data Protocol (PDP) activation process. Briefly, in the process, mobile subscriber 555 requests access to the Access Point Name (APN), for example, UPS.com (e.g., which can be corporate network 589 in FIG. 3) and SGSN 576 receives the activation request from mobile subscriber 555. SGSN 576 then initiates a Domain Name Service (DNS) query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol (PDP) Context Request message that contains necessary information. The GGSN 578 sends a Create PDP Context Response message to SGSN 576, which then sends an Activate PDP Context Accept message to mobile subscriber 555.

Once activated, data packets of the call made by mobile subscriber 555 can then go through radio access network 560, core network 570, and interconnect network 580, in a particular fixed-end system or Internet 584 and firewall 588, to reach corporate network 589.

Thus, network elements can invoke the functionality of the EAS alert reporting in accordance with geo-target mapping, but they are not limited to Gateway GPRS Support Node tables, Fixed End System router tables, firewall systems, VPN tunnels, and any number of other network elements as required by the particular digital network.

Figure 6:
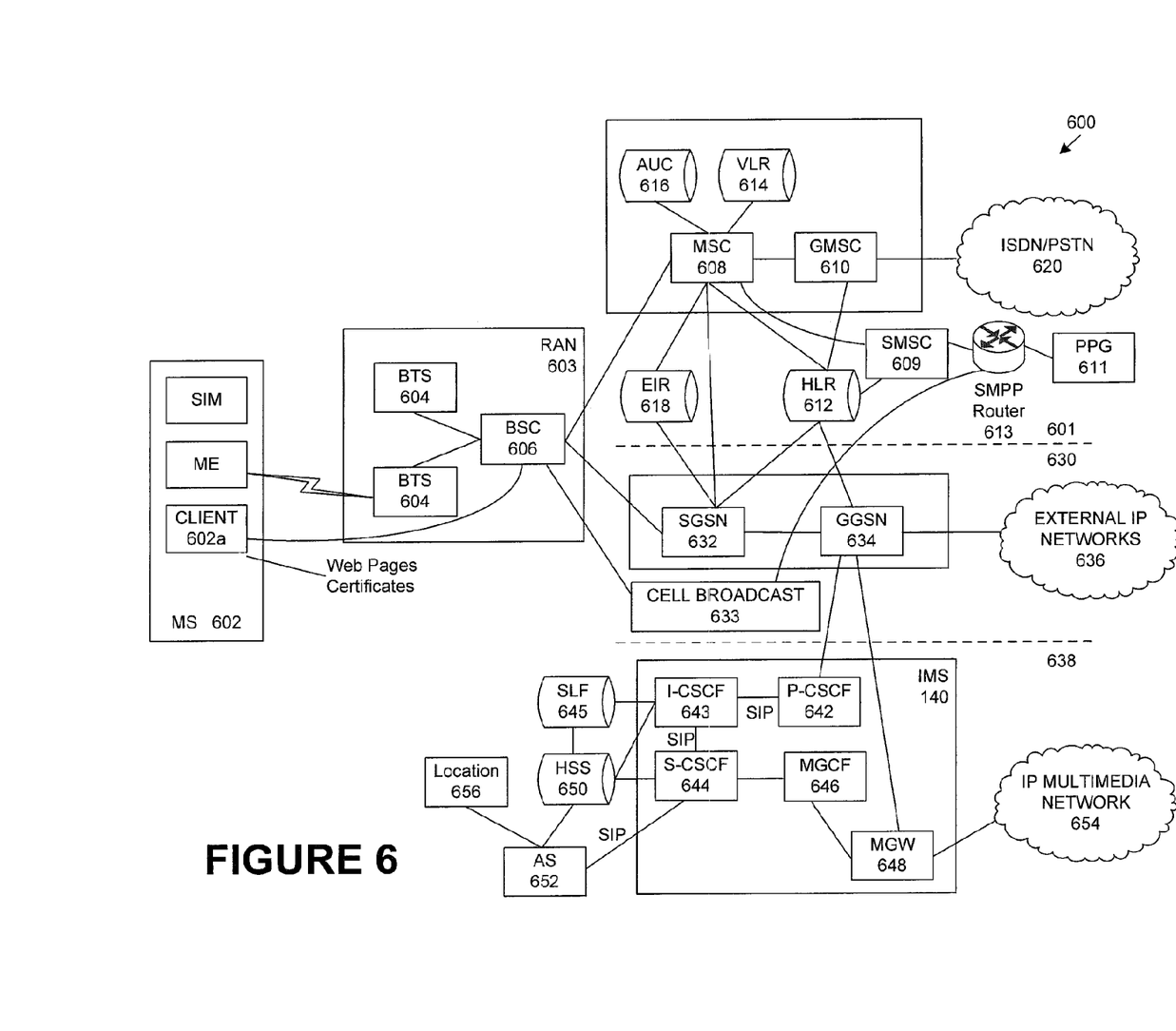
FIG. 6 illustrates an example alternate block diagram of an exemplary GSM/GPRS/IP multimedia network architecture in which alert messages based on a characteristic and/or configuration can be incorporated.

FIG. 6 illustrates another exemplary block diagram view of a GSM/GPRS/IP multimedia network architecture 600 in which geo-target mapping may be incorporated. As illustrated, architecture 600 of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer (e.g., portable device 20) that is used by mobile subscribers, with a Subscriber identity Module (SIM). The SIM includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 403.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSCNVLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 633 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vice versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of an emergency callback system that is subject to certain restrictions have been described in connection with various computing devices, the underlying concepts can be applied to any computing device or system capable of providing a notification for alerting users of portable devices of emergencies. The various techniques described herein can be implemented in connection with hardware or software or, where appropriate, with a combination of both. Thus, the methods and apparatus for an emergency callback system and for related restrictions processing, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for processing restrictions in light of a request for access to a mobile device, such as an emergency call. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for an emergency callback system also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a notification system for alerting users of wireless communication devices of emergencies using a personal area network compatible accessory. When implemented on a general-purpose processor, the program code combines with the processor to provide a unique apparatus that operates to invoke the functionality of restrictions processing. Additionally, any storage techniques used in connection with a notification system for alerting users of wireless communication devices of emergencies using a personal area network compatible accessory can invariably be a combination of hardware and software.

While a callback system with restrictions for wireless communication devices using a personal area network compatible accessory has been described in connection with the various embodiments of the various figures, it is to be understood that other similar embodiments can be used or modifications and additions can be made to the described embodiment for performing the same function of the callback system for communication devices using a personal area network compatible accessory without deviating therefrom. For example, one skilled in the art will recognize that the callback system for wireless communication devices using a personal area network compatible accessory as described in the present application may apply to any environment, whether wired or wireless, and may be applied to any number of such devices connected via a communications network and interacting across the network. Therefore, the callback system for communication devices using a personal area network compatible accessory should not be limited to any single embodiment, but rather should be construed in breadth and scope in accordance with the appended claims.

While restrictions processing for a callback system as disclosed herein can be used determine the broadcasting capabilities of a cell site or telecommunications system, it is to be understood that other similar embodiments can be used or modifications and additions can be made to the described embodiment for performing the same functions described herein. For example, one skilled in the art will recognize that a system of restrictions processing via another relational method can be used determine what restrictions are in effect and which requests for access to a mobile device should be completed, and may apply to any environment, whether wired or wireless, and may be applied to any number of devices connected via a communications network and interacting across the network.

What is claimed:

1. A method comprising:
   receiving, by a service control point (SCP), notification that a call has been placed from a mobile device;
   determining, by the SCP, that the call is an emergency call;
   in response to determining that the call is an emergency call, suspending, by the SCP, a subset of restrictions associated with the mobile device while maintaining another subset of restrictions associated with the mobile device;
   receiving, by the SCP, a callback from an emergency call center in response to the call being disconnected;
   authorizing the callback from the emergency call center, to the mobile device, that would otherwise be restricted by the suspended subset of restrictions;

receiving, by the SCP, a request to access the mobile device that is restricted by an unsuspended restriction in the other subset of restrictions;

denying the request to access the mobile device; and notifying a restricting entity about the suspended subset of restrictions.

2. The method of claim 1, further comprising originating the callback from the emergency call center.

3. The method of claim 1, wherein the restrictions may be any one of: limited number of incoming/outgoing calls, limited number of incoming/outgoing SMS messages, managing when and how the mobile device can communicate, restricting calls made to a particular number or entity.

4. The method of claim 1, further comprising reinstating the suspended restrictions following a triggering event.

5. A system comprising:

a first processor that connects a call to an emergency call center and issues a notification that the call has been connected; and a second processor having a restrictions processing module, wherein the second processor:

receives the notification that the call has been placed;

determines that the call is an emergency call;

suspends, based on the received notification, a subset of restrictions associated with a mobile device while maintaining another subset of restrictions associated with the mobile device, when the call is determined to be an emergency call;

notifies a restricting entity about the suspended subset of restrictions;

receives a first request from the emergency call center in response to the call being disconnected;

authorizes the first request, wherein the first request is a request for mobile device access that would have otherwise been restricted by the suspended restrictions, the second processor coupled to a memory, the memory receiving and storing information relating to the restrictions associated with the mobile device; and denies a second request to access the mobile device that is restricted by an unsuspended restriction in the other subset of restrictions.

6. The system of claim 5, wherein the second request is at least one of: an incoming call, an outgoing call, a callback from an emergency call center, an incoming SMS message, an outgoing SMS message, or a request to connect to a network from the mobile device.

7. The system of claim 5, further comprising the mobile device that is accessed according to the second request.

8. The system of claim 5, further comprising a database associated with the second processor, wherein the database stores details of a subscriber.

9. The system of claim 5, wherein the second processor reinstates the restrictions based on a triggering event.

10. The system of claim 5, wherein the first processor is a Mobile Switching Center (MSC) processor and the second processor is a Service Control Point (SCP) processor.

11. A method comprising:

triggering a Customized Application of Mobile Enhanced Logic (Camel) standard upon receipt of a first request to access a mobile device, wherein the first request is the initiation of an emergency call from the mobile device;

authorizing, by the service control point (SCP), the first request for access to the mobile device;

in response to the first request being the initiation of the emergency call, suspending, by the SCP, a subset of restrictions associated with the mobile device while maintaining another subset of restrictions associated with the mobile device;

receiving a second request for access to the mobile device in response to the emergency call being disconnected, wherein the second request would be otherwise restricted by the suspended subset of restrictions;

authorizing the second request for access to the mobile device;

receiving a third request for access to the mobile device;

denying the third request to access the mobile device, wherein the third request is restricted by an unsuspended restriction in the other subset of restrictions; and notifying a restricting entity about the suspended subset of restrictions.

12. The method of claim 11, wherein the second request is a callback request by an emergency call center, the method further comprising originating a callback from the emergency call center.

13. The method of claim 11, wherein the restrictions may be any one of: limited number of incoming/outgoing calls, limited number of incoming/outgoing SMS messages, managing when and how the mobile device can communicate, restricting calls made to a particular number or entity.

14. The method of claim 11, further comprising reinstating the suspended restrictions following a triggering event.

* * * * *